United States Patent [19]

Lines, Jr. et al.

[11] 4,395,453

[45] Jul. 26, 1983

[54] FIRE AND HEAT RESISTANT STRUCTURE

[75] Inventors: Ellwood L. Lines, Jr., New Haven; Douglas A. Farmer, Jr., Madison, both of Conn.

[73] Assignee: Olin Corporation, New Haven, Conn.

[21] Appl. No.: 301,160

[22] Filed: Sep. 11, 1981

[51] Int. Cl.³ .................... B32B 7/02; B32B 15/08; B32B 9/06; B32B 27/00
[52] U.S. Cl. .................... 428/216; 428/215; 428/449; 428/450; 428/453; 428/461; 428/535; 428/920; 428/921
[58] Field of Search ............... 428/35, 214, 215, 216, 428/449, 450, 453, 461, 535, 920, 921; 229/3.5 MF

[56] References Cited

U.S. PATENT DOCUMENTS

| | | |
|---|---|---|
| 1,273,646 | 7/1918 | Mock . |
| 1,862,301 | 6/1932 | Drexler ...................... 229/3.5 MF |
| 2,064,327 | 12/1936 | Upson ............................ 428/453 |
| 2,125,286 | 8/1938 | Fletcher ................................ 20/4 |
| 2,555,380 | 6/1951 | Stuart et al. ............... 229/3.5 MF |
| 2,699,417 | 1/1955 | Repsher et al. ................. 154/129 |
| 3,183,802 | 5/1965 | Rutledge ............................ 93/80 |
| 3,202,567 | 8/1965 | Muri et al. ...................... 428/461 |
| 3,259,536 | 7/1966 | Gaeth et al. .................... 161/206 |
| 3,357,626 | 12/1967 | Carpenter et al. ................ 229/14 |
| 3,543,460 | 12/1970 | Stastny et al. .................... 52/232 |
| 3,608,769 | 9/1971 | Gablin ............................. 220/10 |
| 3,623,934 | 11/1971 | Madou ............................ 161/5 F |
| 3,687,351 | 8/1972 | Kaercher et al. ................ 229/3.1 |
| 3,694,305 | 9/1972 | Munawwar .................... 161/205 |
| 3,847,724 | 11/1974 | Powers et al. .................. 428/322 |
| 3,873,409 | 3/1975 | Jehier ............................. 161/214 |
| 3,891,135 | 6/1975 | Szatkowski ...................... 229/4.5 |
| 3,934,066 | 1/1976 | Murch ............................ 428/921 |
| 3,972,467 | 8/1976 | Whillock et al. ................ 229/14 |
| 4,054,710 | 10/1977 | Botsolas ......................... 428/228 |
| 4,054,711 | 10/1977 | Botsolas ......................... 428/228 |
| 4,096,309 | 6/1978 | Stillman ......................... 428/285 |
| 4,105,820 | 8/1978 | Antoni ........................... 428/213 |
| 4,196,841 | 4/1980 | Smith et al. ..................... 229/43 |
| 4,205,110 | 7/1980 | Jean ............................... 428/213 |
| 4,244,492 | 1/1981 | Beyerstedt et al. ............. 220/452 |
| 4,323,620 | 4/1982 | Iwabuchi et al. ............... 428/215 |

Primary Examiner—William R. Dixon, Jr.
Attorney, Agent, or Firm—Ralph D'Alessandro; Donald F. Clements; Thomas P. O'Day

[57] ABSTRACT

A fire and heat resistant partition having a plurality of lamina between a first side and an opposing second side is provided to protect an object adjacent the first side from a fire or heat generating source adjacent the second side, the first lamina being formed at least partially of aluminum. The first lamina is bonded to at least one ply that is formed from multiple laminae of fibrous material which are bonded to an intermediate lamina of predetermined thickness formed at least partially of aluminum.

39 Claims, 5 Drawing Figures

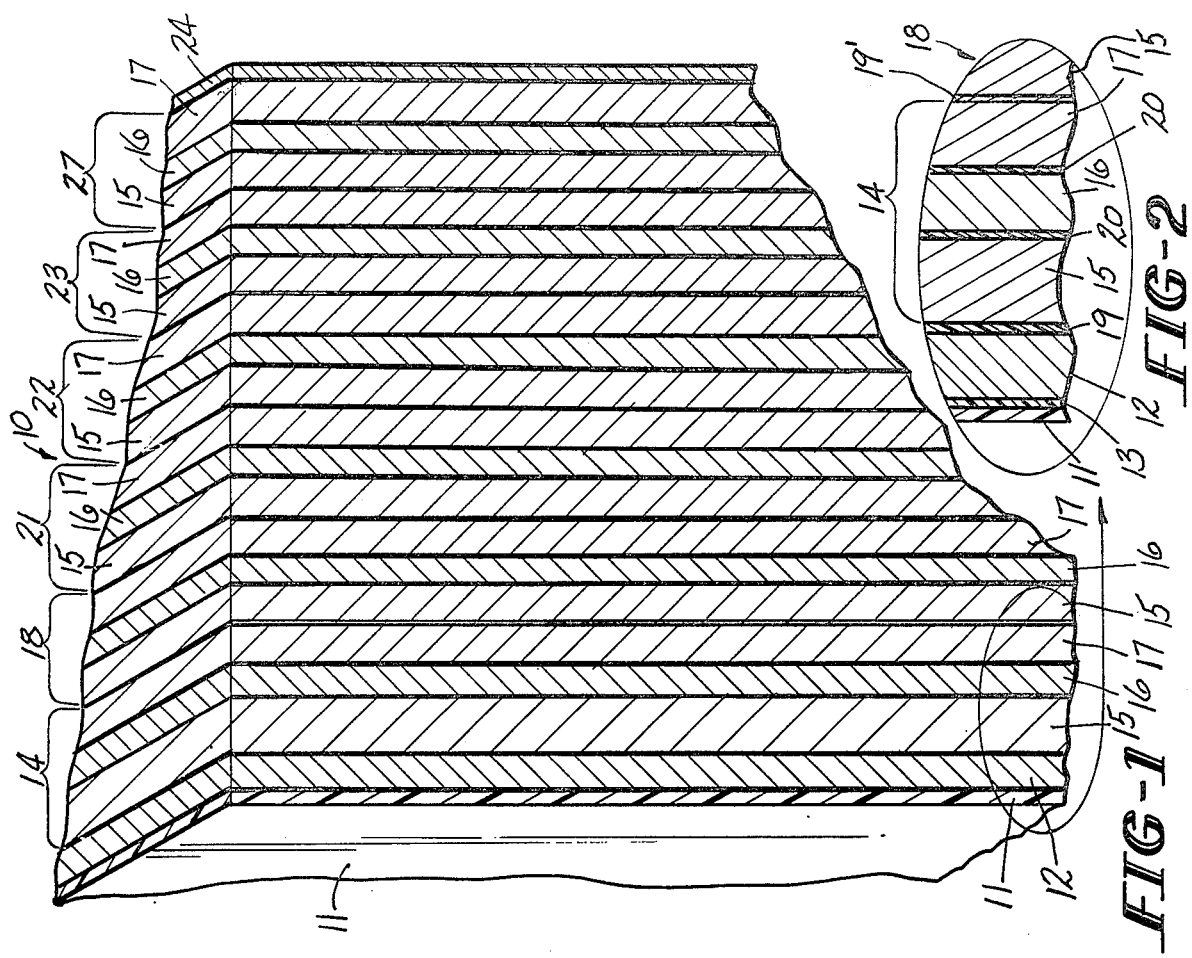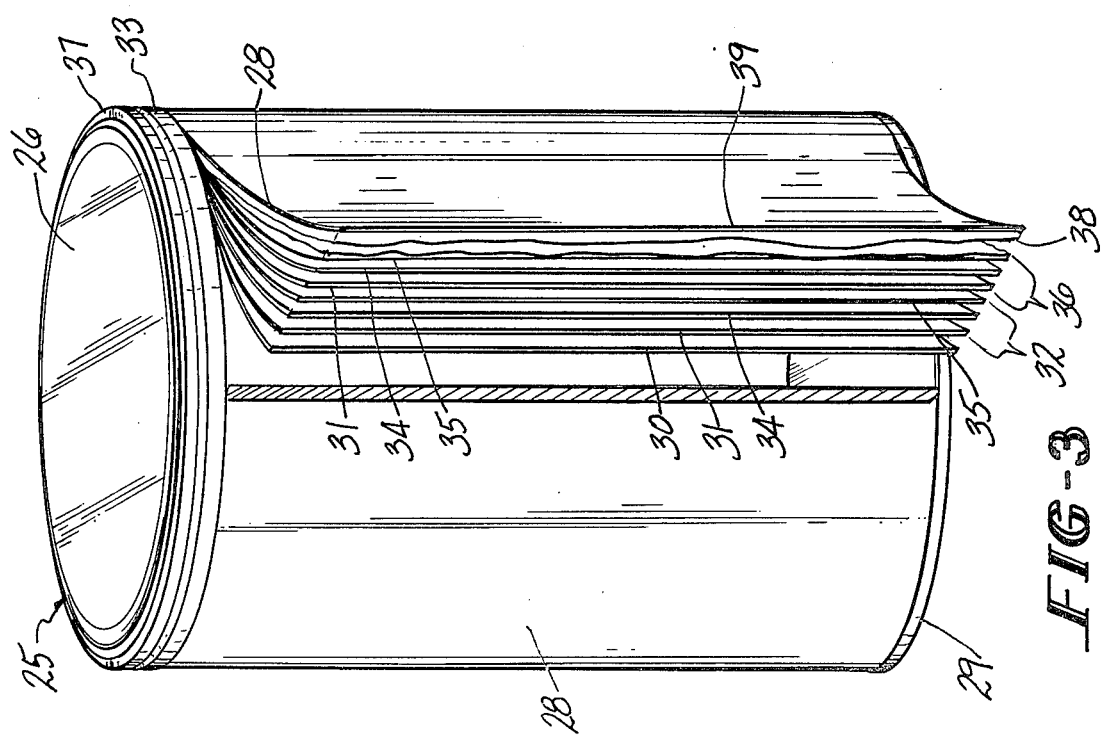

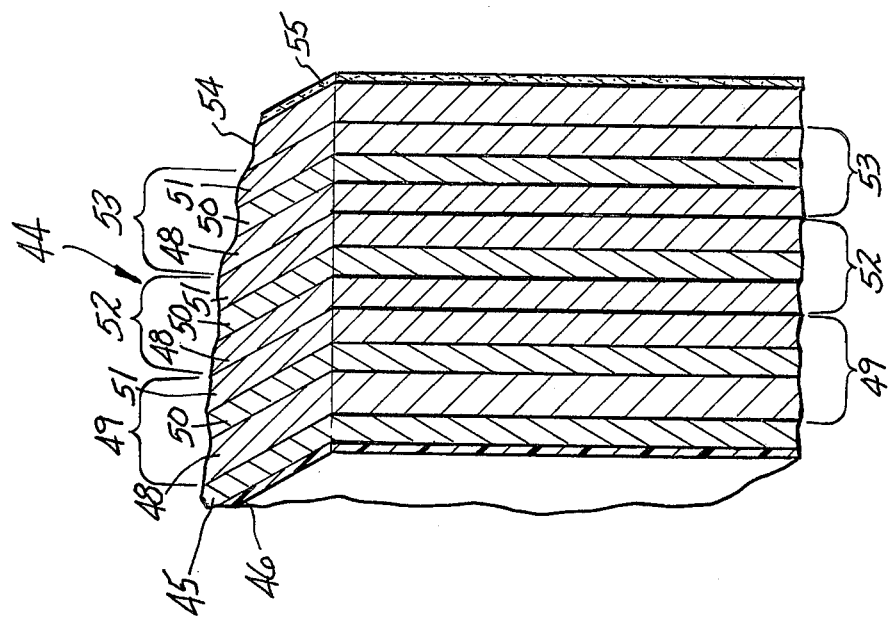
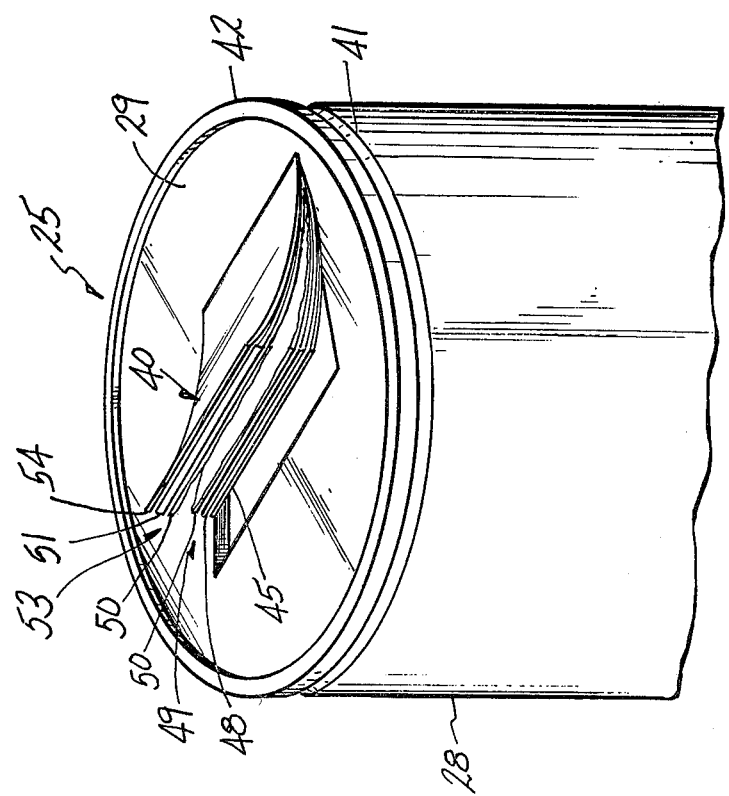

FIRE AND HEAT RESISTANT STRUCTURE

BACKGROUND OF THE INVENTION

This invention relates generally to fire and heat resistant structures and more specifically to a partition that may be used to protect a substance adjacent one side of the partition from a fire or heat generating source adjacent the opposing side.

There have been numerous attempts to design partitions for use separately or for incorporation into containers to provide efficient shock absorption, fire resistance and thermal insulation to protect a substance adjacent one side of the partition or sidewall from a fire or heat-generating source adjacent the opposing side. Energy-reflective layers, such as aluminum foil, have been wound or placed about energy-absorbing elements, fibrous material has been treated with fire resistant or retardant substances and laminae of combustible materials have been bonded with intumescent or fire resistant bonding agents. Generally, however, all of the previous methods have failed to provide a separate partition or a structure incorporable into the sidewall of a container with sufficient strength to withstand the shock to which such structures are subjected or with sufficient fire resistance to be applicable to fibrous materials.

Additionally, where strongly corrosive agents, such as chlorine-evolving substances, are to be stored either within a container or adjacent one of the sides of the partition, the prior design partitions and containers have failed to provide a structure that is sufficiently resistant to the corrosive tendencies of chlorine. Such substances can slowly decompose when stored for relatively long periods of time, releasing chlorine as a decomposition product. This chlorine can combine with moisture in the surrounding air to form the mildly acidic, but corrosive, hypochlorous acid and other corrosive agents.

Another related problem can present itself where the partition or sidewall is used to separate a strong oxidizing agent, such as calcium hypochlorite, from a potential heat or fire generating source. This is especially troublesome in partitions or sidewalls employing fibrous, and therefore combustible, materials. Should the heat or fire generating source provide sufficient heat, the oxidizing agent, such as calcium hypochlorite, can be composed, releasing pure oxygen. Should the container, sidewall or partition ignite, this pure oxygen would accelerate the combustion rate of any combustible materials.

The foregoing problems are solved in the design of the present invention comprising a partition that is comprised of a first lamina of predetermined thickness formed at least partially from aluminum and bonded to a predetermined number of plies formed of desired number of lamina arrayed in a desired sequence. The plies are bonded to each other by a fire resistant bonding agent.

SUMMARY OF THE INVENTION

It is an object of the present invention to provide an improved partition that is fire and heat resistant.

It is another object of the present invention to provide an improved partition which is resistant to the corrosive effect of certain chemicals, such as chlorine.

It is an advantage of the present invention that partitions constructed of the materials in the manner disclosed herein will possess greater resistance to ignition when exposed to sustained and intense temperatures and fire.

It is another advantage of the present invention that the partition is insulated to reduce the spread of heat through the partition to a substance on the opposing side of the partition from the heat generating source.

It is a feature of the present invention that the partition has an inner liner comprised of aluminum with a polymer coating that is corrosion resistant.

It is another feature of the present invention that the structure of the partition is comprised of laminated plies that moderate heat flow from one side to the opposing side when exposed to a fire and heat generating source.

It is another feature of the present invention that the aluminum-polymer coated liner on one side of the partition aids in preventing a strong oxidizing agent, such as calcium hypochlorite, and its decomposition by-product of pure oxygen from potentially contributing to the burning of combustible materials in the partition and the surrounding area.

These and other objects, features and advantages are provided in the improved fire and heat resistant partition having a first side and an opposing second side with a plurality of laminae therebetween to protect an object adjacent the first side from a fire or heat generating source adjacent the first side; the first lamina adjacent the first side being of a predetermined thickness and formed at least partially of aluminum and being bonded to at least one ply. The ply is formed from a second lamina of fibrous material bonded to a third lamina formed at least partially of aluminum which is in turn bonded to a fourth lamina of fibrous material; each lamina being of predetermined thickness and strength.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is an enlarged end perspective view of a portion of the fire and heat resistant partition showing the multiple laminae and plurality of plies assembled in a preferred embodiment;

FIG. 2 is an enlarged view showing a portion of the partition, including one ply for the preferred embodiment;

FIG. 3 is a side perspective view of a cylindrical container having a partition of FIG. 1 incorporated there into the sidewall with a portion of the sidewall broken open and sectioned;

FIG. 4 is an end perspective view of a portion of an alternative embodiment of the fire and heat resistant partition; and FIG. 5 is a perspective view of a portion of the cylindrical container shown in an inverted position having the partition of FIG. 4 incorporated into the bottom with a portion of the bottom broken open and sectioned.

DETAILED DESCRIPTION OF THE PREFERRED EMBODIMENT

Referring to FIG. 1, there is shown a portion of a partition indicated generally by the numeral 10 in end perspective view. Partition 10 has on one side or surface a coating 11 of a suitable polymer material that is applied to a first lamina 12, preferably formed from aluminum foil. Lamina 12 is bonded to a first ply indicated generally by the numeral 14. Ply 14 consists of three distinct laminae appropriately bonded together. Lamina 15 is formed of a suitable fibrous material and is adjacent lamina 16 which is formed at least partially of aluminum and preferably is an aluminum foil of predetermined thickness. Adjacent the lamina of aluminum foil is another lamina 17 of fibrous material. A second ply, indicated generally by the numeral 18, is similarly formed and is bonded by a suitable fire resistant bonding agent, such as a water soluble silicate, to the first ply.

FIG. 2 shows an enlarged partial view of the first ply 14 sandwiched between the lamina 12 and the lamina 15 of fibrous material which is the first lamina of the adjacent second ply 18. This enlarged view shows the coating 11 of polymer bonded to the lamina 12 of aluminum foil with an appropriate bonding agent 13, such as a thermoplastic polyethylene. The lamina 12 is shown bonded to the lamina 15 of fibrous material by a suitable bonding agent, such as a thermoplastic polyethylene, indicated by the numeral 19. The lamina 15 of fibrous material is bonded within the ply 14 to the lamina 16 of aluminum foil, which is in turn bonded to a second lamina 17 of fibrous material, as previously described. Bonding agent 20 bonds each lamina 15 and 17 of fibrous material to the opposing sides of the lamina 16 of aluminum foil. Lamina 17 is also bonded by the appropriate fire resistant bonding agent, such as a water soluble silicate adhesive, 19' to the first lamina 15 of the adjacent second ply 18.

Therefore, as best seen in FIG. 2, each ply employed in the partition 10 is comprised of three laminae; two laminae of fibrous material sandwiched about the intermediate lamina of aluminum foil. The fibrous material typically is Kraft paper, preferably of a density of approximately 26 pounds per one thousand square feet. The lamina 16 of aluminum foil is of a predetermined thickness, generally from about 0.20 mils to 0.50 mils. The preferred thickness is approximately 0.35 mils, although the thickness could be greater or less, as desired. The lamina 12 of aluminum foil also has a predetermined thickness from about 0.75 mils to about 3.25 mils. In the preferred embodiment, lamina 12 is approximately 1 mil thick, although laminae as thin as about 0.35 mils and as thick as about 3.0 mils have been employed. Bonding agent 20 is preferably an organic bonding agent, such as thermoplastic polyethylene.

The polymer coating 11 applied to the aluminum foil lamina 12 is generally approximately 1 mil thick and can either be a polyethylene, polyester or any other suitable type of plastic, although the thickness can be greater or less as desired. The preferred composition is polyester, such as the Mylar ® polyester film sold by the E. I. DuPont de Nemours & Co. of Wilmington, De. The thickness of the water soluble silicate adhesive, preferably a sodium silicate, although another alkali metal silicate may be suitable, is from about 0.5 mils to about 3.0 mils. An operable range of thickness of the silicate is from about 0.1 mil to about 20 mils thickness. Each layer of the silicate adhesive is of generally uniform and continuous thickness. On a wet basis, the silicate application level preferably is approximately 1 pound per 1000 square feet of fibrous material. The water soluble silicate with its hydrated water is known to form a burn-retarding siliceous or glassy foam when subjected to temperatures above the decomposition temperature of the silicate hydrate.

Referring again to FIG. 1, it can be seen that additional plies are bonded to the first and each subsequent ply by the aforementioned fire resistant bonding agent. Each individual ply comprises a lamina 15 of fibrous material, a lamina 16 of aluminum foil, and a lamina 17 of fibrous material as previously described. Thus, plies 14, 18, 21, 22, 23, and 27 are all shown as plies containing three laminae. Attached to the last or outermost of the plies in FIG. 1 is a lamina 24. This lamina 24 can be of fibrous material, such as a desired weight of Kraft paper, or of aluminum foil, or other fibrous material, such as a label. Lamina 24 is also preferably bonded to the fibrous material of lamina 17 in ply 23 by a suitable fire resistant bonding agent, such as a water soluble silicate.

FIG. 3 shows a cylindrical drum container, indicated generally by the numeral 25, that has a top 26 and a bottom 29 which are interconnected by a sidewall 28. The sidewall 28 is shown broken open and with the individual plies and laminae separated. The sidewall 28 has the same structure utilized in the partition 10 of FIG. 1 incorporated thereinto so that on the inner surface of the container 25 there is seen an aluminum lamina 30 that may be coated with a suitable polymer substance, as previously mentioned. Adjacent the lamina 30 is a fibrous material lamina 31 that is the first lamina of the first three-laminae ply, indicated generally by the numeral 32, in the sidewall 28. Adjacent the fibrous material lamina 31 is an aluminum foil lamina 34, to which is bonded another fibrous material lamina 35. Thus, laminae 31, 34, and 35 comprise the first ply 32. Ply 32 is bonded to lamina 30 by a bonding agent, such as a thermoplastic polyethylene, and is bonded to the next adjacent ply, indicated generally by the numeral 36, by a suitable fire resistant bonding agent, such as a water soluble silicate type of adhesive. Thus, ply 36 comprises a lamina of fibrous material 31 bonded to a lamina of aluminum foil 34 which is in turn bonded to another lamina of fibrous material 35. The three laminae are repeated in the same sequence in each successive ply. The additional plies are not shown in FIG. 3 since, for simplicity of viewing, the laminae are broken away between fibrous material lamina 35 of the second ply 36 and the fibrous material lamina 38 that is adjacent the outer surface of the sidewall 28. As seen in FIG. 3, lamina 38 has a lamina 39 bonded to it by a suitable fire resistant bonding agent, such as a water soluble silicate, and thereby defines the outer surface of the sidewall 28. Lamina 39 may be of any desired thickness of fibrous material, such as 26 pound or 46 pound Kraft paper, or may be of aluminum foil or another material suitable to form a label.

It should be noted in this preferred embodiment that all of the plies in the sidewall 28, including plies 32 and 36, are formed of the same material and are bonded to the same material as previously described in relation to the partition 10. Similarly, the relative thicknesses of the bonding agents are also the same as described in the structure of the partition 10.

The top 26 of drum container 25 is a removable lid formed from a suitable material, such as galvanized steel, which is coated on the inner side with an epoxy-/phenolic spray coat or other suitable coating to protect the metal from the corrosive nature of any of the reactive substances which may be stored within the container. Top 26 is removable via a suitable retaining mechanism which is not shown. Additionally, the top of the drum is manufactured to permit any gases which are formed within the drum container 25 to be able to escape between the rim 37 and the chime or top edge 33 (partially shown) of the sidewall 28. The bottom 29 of the drum may also employ a chime. The chime 33 and the rim 37 are made of an appropriate metal, such as galvanized steel.

FIG. 4 shows an alternative embodiment of a fire and heat resistant partition that can be incorporated into the bottom 29 of drum container 25 or utilized as a separate fire and heat resistant partition. FIG. 5 shows the drum container 25 inverted with the bottom 29 having a portion, indicated generally by the numeral 40, broken open and separated to show the individual laminae. A chime 41 is also partially shown in FIG. 5 to illustrate how the rim 42 of the bottom 29 fits thereagainst. Both the chime 41 and rim 42 are made from a suitable metal, such as galvanized steel.

The partition indicated generally by the numeral 44 in FIG. 4 is shown comprising an inner surface that is defined by a lamina 45 formed of aluminum, such as aluminum foil, and which has a polymer coating 46 applied thereto. The aluminum lamina 45 is bonded by a suitable bonding agent to a first fibrous materialed lamina 48 of a first interior ply, indicated generally by the numeral 49. First ply 49 is a three-laminae ply, repeating the sequence and materials in the individual laminae that have been previously described. The middle lamina in ply 49 is lamina 50 formed of aluminum of predetermined thickness which is bonded by a suitable bonding agent to a lamina of fibrous material 51. The laminae 48 and 51 are formed of a fibrous material of predetermined thickness, such as the 26 pound Kraft paper previously described, or a 46 pound Kraft paper or of any other suitable material. These fibrous materialed laminae 48 and 51 are bonded to the aluminum lamina 50 typically by a thermoplastic bonding agent, such as polyethylene (not shown). As seen in FIG. 4, a second ply indicated generally by the numeral 52, is shown adjacent the first ply 49 and is formed of laminae which are arrayed in the same fashion as those employed in the first ply 49. A third ply indicated generally by the numeral 53 is bonded to the second ply 52 and also comprises the same laminae arrayed in the same sequence as those in the first ply 49. The plies 49, 52, and 53 are bonded to each other by a suitable fire resistant bonding agent, such as any water soluble silicate adhesive; for example, the sodium silicate previously described. The adhesive is continuously applied between each ply and is generally of a uniform thickness as previously described in relation to partition 10. Bonded to the outermost fibrous materialed lamina 51 of ply 53 is a lamina 54, also made of fibrous material of predetermined thickness. The outer surface of lamina 54 is coated, with an intumescent paint layer indicated by the numeral 55. The intumescent paint employed is commercially available from a number of suppliers, such as ALBI Corporation of East Berlin, Conn. or PPG Industries, Inc. of Pittsburgh, Pa.

It should be noted that the partition described in FIG. 4 could well be employed in the sidewall 28 of the cylindrical drum container 25. Additionally, the lamina 54 of fibrous material could be applied adjacently to the outermost or third ply 53 in a number that could vary from the shown single lamina to as many as five laminae bonded to the plies formed from the aforementioned three laminae arrayed in the fashion previously described. Similarly, these plies formed from the three laminae could range from as few as a single ply bonded to the inner surface liner formed of the aluminum lamina 45 with a polymer coating 46 to as many as six or more plies.

Referring again to FIG. 5 and specifically the portion 40, the laminae and plies are arrayed in the bottom 29 of drum container 25 generally as shown in FIG. 4. The fibrous materialed lamina 54, to which is applied the intumescent paint layer 55 (not shown) is bonded to the outermost lamina 51 of ply 53. The intermediate aluminum lamina 50 of ply 53 is also partially shown, lamina 50 being broken away for simplicity in viewing. The remaining fibrous materialed lamina 48 of ply 53 and ply 52 are not showing primarily to permit the structure of the bottom 29 to be illustrated in a graphically simplified fashion. The aluminum lamina 50 of ply 49 is partially shown adjacent the innermost lamina 48 of ply 49. The inner surface lamina 45 is shown adjacent lamina 48 and has a suitable polymer coating (not shown) applied to it. The thicknesses of the individual laminae, as well as the thicknesses and types of bonding agents employed between each pair of laminae are generally as described for the partition 44 of FIG. 4.

The number of plies and the number of laminae of fibrous material employed are a matter of choice as to the degree of fire and heat resistance and structural strength that is desired to be obtained. Generally, it has been determined that a greater number of plies employed with varied numbers of fibrous materialized laminae, arrayed as illustrated by lamina 54 in FIG. 4, in conjunction with the polymer coated aluminum lamina 45 comprising the inner surface, increases the fire and heat resistance of the partition. It has also been found that the thickness of the fire resistant bonding agent, such as a water soluble silicate adhesive, utilized to bond each of the adjacent plies to each other and any adjoining fibrous materialized laminae, is a significant factor in contributing to the fire and heat resistance. Generally, the thicker the silicate adhesive, the greater are the fire and heat resistant characteristics of the partition or sidewall. Fire resistant compounds, other than water soluble or alkali metal silicates, could be employed either as the fire resistant bonding agent or admixed with the bonding agent to improve its fire resistant characteristics. Such compounds could include alums, such as ammonium sulfate, ammonium phosphates, antimonic oxides, borates or organic fire retardants such as organic halides. It should also be noted that the bonding agent employed between each of the three laminae of each ply, and between the first lamina and the first ply, although described as being an organic adhesive such as a thermoplastic polyethylene, could equally contain a fire resistant material water soluble silicate. Conversely, the bonding agent employed between all of the individual laminae could be an organic adhesive such as polyethylene instead of the fire resistant silicates described.

Although the inner surface first lamina to which the polymer coating has been applied, as well as the intermediate lamina within each ply, has been described as being comprised of aluminum, any other suitable metal or material could also be employed. Other suitable metals could include tin, iron or steel, zinc, magnesium, etc. or any other material which is resistant to fire and formable into relatively thin sheets.

It should further be understood that the thickness of the aluminum laminae both in the plies and the first lamina can vary within substantially greater ranges than those previously mentioned, being limited practically by economic and manufacturing considerations. Similarly, the densities or thicknesses of the laminae of fibrous material can vary within substantially greater ranges than the 26 pound and 46 pound Kraft paper previously mentioned. These thicknesses, whether recited for laminae forming the plies or for the other individual laminae of fibrous material, are also limited practically by economic and manufacturing considerations, but could range from some density less than 26 pounds, such as 13 pounds per thousand square feet to as great as 90 pounds per thousand square feet of Kraft paper or liner board.

In order to illustrate the results achieved with the improved fire and heat resistant partition and fire and heat resistant drum disclosed herein, the following examples are provided without intent to limit the scope of the instant invention to the discussion therein.

TEST METHOD I

A small scale fire and heat resistant test method was designed employing a Bunsen burner satisfying federal specification NNN-B-795. The burner was positioned adjacent to a ring stand. The Bunsen burner was supplied with natural gas through a gas flow indicator. A 6 inch long by 4 inch outer diameter glass tube was clamped about the burner. This glass tube extended upwardly about 2½ inches above the top of the burner and was supported by a clamp attached to the ring stand. The burner was centered within the glass tube.

A sample holder, made of 3/16 inch steel, was attached to the ring stand. The sample holder was a 3⅛ inch diameter hollow tube that was open on both ends. On one end it was welded to a 6 inch diameter flange that had a 3⅛ inch central hole about which the open-ended hollow tube was centered. The flange may be either flat or curved, corresponding to the shape of the surface of the sample to be tested. A 6 inch square of the fire and heat resistant partition or an approximately 6 inch square of the curved portion of the fire and heat resistant container's sidewall was appropriately clamped to the bottom of the flange, such as with spring loaded clamps. The sample holder with the test sample partition or portion of the sidewall was attached to the ring stand and was adjusted so that the lowest part of the sample was ½ inch from the top of the glass tube and 3 inches from the top of the burner. An appropriate thermocouple, such as a chromel-alumel, was inserted into the sample holder so that the thermocouple junction touched the inside center of the sample. A temperature recorder was attached to the thermocouple.

50 Grams of 65% granular calcium hypochlorite was placed in the sample holder and smoothed to form a level surface. The Bunsen burner was lit and the temperature recorder and a stop watch were simultaneously started. The Bunsen burner was adjusted, prior to the test and before the sample holder was positioned, so that a flame was obtained with a 1 inch blue inner-cone. Data recorded for the tests conducted for each sample were the averaged elapsed time to product involvement, as evidenced by the readily observed exothermic decomposition of the calcium hypochlorite and an extremely rapid temperature rise, and a description of the violence of the calcium hypochlorite decomposition.

The following samples were tested by being exposed to a standard temperature of approximately 1250° F. from the Bunsen burner. All samples had their adjacent plies or laminae bonded by a suitable water soluble silicate adhesive, unless otherwise noted. The outer lamina of fibrous material on the opposing side from the first aluminum foil lamina was closest to the flame. In each instance, the outermost lamina or ply was bonded to a lamina of standard thickness fibrous material that was employed as a label and was immediately adjacent the flame of the Bunsen burner. It is understood that all of the recited thickness and weights of the particular materials employed are approximate.

Example A comprised an inner liner of 2 mils thick polyethylene coating, a 0.35 mil thick aluminum foil lamina that was bonded with a thermoplastic polyethylene adhesive to the first of six adjacently positioned laminae which were bonded to each other. Each of the laminae was 46 pound Kraft paper.

Example B utilized a 1 mil thick aluminum foil lamina bonded to a 46 pound Kraft paper lamina that was bonded to three adjacently bonded laminae of 46 pound Kraft paper. These laminae were each treated with intumescent paint. The adjacent Kraft paper laminae were bonded to another three adjacently positioned laminae of 46 pound Kraft paper. The intumescent paint was applied to one surface of each of the laminae which were then oriented so that the treated surfaces were closer to the first aluminum foil lamina than the outermost lamina.

Example #1 comprised a 1 mil thick polyester coating which was applied to a 3 mils thick aluminum foil lamina that was bonded via a thermoplastic polyethylene adhesive to a 46 pound Kraft paper lamina. The Kraft paper lamina was in turn bonded to three adjacently positioned plies. Each ply was comprised of two laminae of 26 pound Kraft paper sandwiched about an intermediate 0.35 mil thick aluminum foil lamina. The outermost ply was bonded to three adjacently positioned laminae of 46 pound Kraft paper.

Example #2 was formed from a first lamina of 1 mil thick aluminum foil bonded to a 46 pound Kraft paper lamina. This Kraft paper lamina was bonded to three adjacently positioned plies, each ply being formed from two 26 pound Kraft paper laminae sandwiched about an intermediate 0.35 mil thick aluminum foil lamina. The outermost ply was bonded to three adjacently positioned laminae of 46 pound Kraft paper. The laminae within each ply, as well as the first aluminum foil lamina and the 46 pound Kraft paper lamina, were bonded together by a thermoplastic polyethylene adhesive.

Example C was formed from a 3 mils thick aluminum foil lamina bonded to a 46 pound Kraft paper lamina by a thermoplastic polyethylene adhesive. The Kraft paper lamina was bonded to three adjacently positioned laminae of 46 pound Kraft paper, which were in turn bonded to three adjacently positioned laminae of intumescent paint-treated 46 pound Kraft paper.

Example D comprised a 1 mil thick aluminum foil lamina bonded to a 46 pound Kraft paper lamina which was in turn bonded to three adjacently positioned laminae of 46 pound Kraft paper. Bonded to these three laminae were three laminae of intumescent paint-treated 46 pound Kraft paper. The aluminum foil lamina and the first Kraft lamina were bonded together by a thermoplastic polyethylene adhesive.

Example #3 was formed from a 3 mils thick lamina of aluminum foil coated with 1 mil thick polyester coating. The aluminum foil lamina was bonded to a 46 pound Kraft paper lamina. This 46 pound Kraft paper lamina was bonded to a single ply comprised of two laminae of 26 pound Kraft paper sandwiched about an intermediate lamina of 0.35 mil thick aluminum foil. This single ply was then bonded to five laminae of 46 pound Kraft paper. Each of the Kraft laminae and the single ply were bonded together by the aforementioned water soluble silicate adhesive, while the laminae within the single ply, as well as the first aluminum foil lamina and the first 46 pound Kraft paper lamina, were bonded together by a thermoplastic polyethylene adhesive.

Example #4 was formed from a 1 mil thick aluminum foil lamina that was bonded to a 46 pound Kraft paper lamina which was in turn bonded to six adjacent plies. Each ply had a pair of 26 pound Kraft paper laminae sandwiched about an intermediate 0.35 mil thick aluminum foil lamina. Each of the individual laminae within the plies, plus the first aluminum foil lamina and the 46 pound Kraft paper lamina, were bonded together by a thermoplastic polyethylene adhesive.

Example #5 was formed from a 1 mil thick aluminum foil lamina that was coated with a 1 mil thick polyester coating. The aluminum foil lamina was bonded to six adjacent plies, each ply having a pair of 26 pound Kraft paper laminae sandwiched about an intermediate 0.35 mil thick aluminum foil lamina. Each of the individual laminae within the plies, the polyester coating and the aluminum foil lamina, plus the aluminum foil lamina and the first ply, were bonded together by a thermoplastic polyethylene adhesive.

The following results were observed for each example:

| Example | Time To Decomposition | Observation |
| --- | --- | --- |
| A | 1 min., 17 sec. | pyrotechnic decomposition |
| B | 3 min., 30 sec. | no flame or fire |
| 1 | 12 min., 34 sec. | no flame or fire |
| 2 | 16 min., 15 sec. | no flame or fire |
| C | 8 min., 37 sec. | no flame or fire |
| D | 7 min., 30 sec. | no flame or fire |
| 3 | 10 min., 25 sec. | no flame or fire |
| 4 | 23 min., 11 sec. | no flame or fire |
| 5 | 14 min., 46 sec. | very mild pyrotechnic decomposition |

Examples A, B, C, and D present comparative data of partitions that employed different construction from that which was found to provide the improved fire and heat resistant results encompassed by the instant invention, especially with respect to the time to sample decomposition.

TEST METHOD II

The following examples of an improved fire resistant cylindrical drum or container were tested in a simulated sprinklered warehouse. The warehouse was approximately 18 feet high and 18 feet deep with a concrete floor. The warehouse was 32 feet wide. The walls were formed on three sides of concrete blocks reinforced with structural steel in the corners. The front wall was made of galvanized metal with swinging doors. This test facility was outfitted with six sprinkler heads of the standard type utilized in warehouses. The sprinklers were set every 8 feet across the width of the test facility and 4 feet inset from the front and rear walls. Thus, there were two rows of three sprinkler heads each. The sprinklers were thermally activated when the ceiling temperatures reached 160° F.

The drums were normally stacked on pallets two drums high, each drum holding 75 pounds of 65% granular calcium hypochlorite. The pallets were standard wooden type pallets approximately 40 inches by 48 inches. An ignitor available from Factory Mutual Research Corporation of Norwood, Mass., was employed to start the test fire. The ignitor was a 3 inch diameter by 6 inch long cellular cotton material that was enclosed in a plastic bag and soaked in 8 ounces of gasoline prior to lighting. The purpose of the test was to obtain a sprinkler-controllable fire within the test facility. Data observed were the time to first rupture of the drum, the nature of the fire, the degree of decomposition of the calcium hypochlorite within the drums, activation of the sprinklers and the general time from ignition to conclusion of the test.

The thickness and weights of the particular materials employed are understood to be approximate. All drum samples have their adjacent sidewall plies or laminae bonded by a suitable water soluble silicate adhesive, unless otherwise noted. For each sample drum, the outermost sidewall lamina or ply was bonded to a lamina of standard thickness fibrous material that was employed as a label. Where the innermost aluminum foil lamina was bonded to a 46 pound Kraft paper lamina, as well as where the aluminum foil lamina was bonded to a ply, a thermoplastic polyethylene bonding agent or adhesive was employed. The same adhesive was employed to bond together the laminae within each ply. The innermost lamina or liner was adjacent the calcium hypochlorite. All of the drum samples had a removable top made of a uniform and predetermined thickness of galvanized steel.

Example #1 utilized a cylindrical drum type of container that had a sidewall with an innermost liner formed of a 1 mil thick polyester coating applied to a 3 mils thick aluminum foil lamina. The first lamina was bonded to a 46 pound Kraft paper lamina that was in turn bonded to a ply which was formed from two 26 pound Kraft paper laminae sandwiched about an intermediate 0.35 mil thick aluminum foil lamina. Five additional adjacently positioned plies of the identical structure were then bonded together, the first of these five being bonded to the previously mentioned adjacent ply.

The bottom was formed from a 1 mil thick polyester coating bonded to a 3 mils thick aluminum foil lamina. A Kraft liner board lamina coated on its outer surface with intumescent paint was bonded to the aluminum foil lamina to form a 120 mils thick bottom. The intumescent paint, PPG 42-7 produced by PPG Industries, Inc., was applied to the exterior side of the lamina. The aluminum foil lamina was bonded both to the polyester and the Kraft lamina by a thermoplastic polyethylene adhesive.

Sixteen drums were stacked on two pallets, each pallet having 2 tiers. The 4 drums in each tier were arranged in a 2 by 2 pattern. The two pallets were stacked one on top of the other.

Example #2 was comprised of a 3 mils thick aluminum lamina to which was bonded a 1 mil thick polyester coating. The first lamina was then bonded to a 46 pound Kraft paper lamina by thermoplastic polyethylene adhesive. The 46 pound Kraft paper lamina was bonded to a ply comprised of two laminae of 26 pound Kraft paper sandwiched about an intermediate 0.35 mil thick aluminum foil lamina. Two additional plies of identical structure were bonded adjacently thereagainst. The outermost ply was bonded to four laminae of 46 pound Kraft paper.

The bottom was formed from a 1 mil thick polyester coating bonded to a 3 mils thick aluminum foil lamina. A Kraft liner board lamina coated on its outer surface with intumescent paint was bonded to the aluminum foil lamina to form a 120 mils thick bottom. The intumescent paint, PPG 42-7 produced by PPG, Industries, Inc., was applied to the exterior side of the lamina. The aluminum foil lamina was bonded both to the polyester and the Kraft lamina by a thermoplastic polyethylene adhesive.

Six drums were stacked in two tiers on a single pallet. There were 3 drums arranged contiguously per tier.

Example #3 was formed from a 1 mil thick aluminum foil lamina which was bonded to a 46 pound Kraft paper lamina. This Kraft paper lamina was bonded to a ply comprised of two 26 pound Kraft paper laminae sandwiched about an intermediate 0.35 mil thick aluminum foil lamina. Two additional plies of identical structure were bonded adjacently thereagainst. The outermost ply was bonded to four adjacently positioned laminae of 46 pound Kraft paper.

The bottom was formed from a 1 mil thick lamina of aluminum foil. A Kraft liner board lamina coated on its outer surface with intumescent paint was bonded to the aluminum foil lamina to form a 120 mils thick bottom. The intumescent paint, PPG 42-7 produced by PPG Industries, Inc., was applied to the exterior side of the lamina. The aluminum foil lamina was bonded to the Kraft lamina by a thermoplastic polyethylene adhesive.

The drums were stacked in two tiers with 8 drums per tier. The 16 drums were arranged in a 3-2-3 staggered pattern on a single pallet.

Example #4 was formed from a 3 mils thick aluminum foil lamina that was coated with a 1 mil thick polyester coating. This aluminum foil lamina was bonded to a 46 pound Kraft paper lamina that was in turn bonded to a single ply comprised of two 26 pound Kraft paper laminae sandwiched about an intermediate 0.35 mil thick aluminum foil lamina. Six laminae of adjacently positioned 46 pound Kraft paper were then bonded to the single ply.

The bottom was formed from a 1 mil thick polyester coating bonded to a 3 mils thick aluminum foil lamina. A Kraft liner board lamina coated on its outer surface with intumescent paint was bonded to the aluminum foil lamina to form a 120 mils thick bottom. The intumescent paint, PPG 42-7 produced by PPG Industries, Inc., was applied to the exterior side of the lamina. The aluminum foil lamina was bonded both to the polyester and the Kraft lamina by a thermoplastic polyethylene adhesive.

The drums were stacked in two tiers with 8 drums per tier. The 16 drums were arranged in a 3-2-3 staggered pattern on a single pallet.

Example #5 was formed from a 1 mil thick aluminum foil lamina that was coated with a 1 mil thick polyester coating that thereby formed the liner. Six plies of identical structure were bonded to the liner. Each ply comprised two 26 pound Kraft paper laminae sandwiched about an intermediate 0.35 mil thick aluminum foil lamina.

The bottom of the drum was comprised of 1 mil thick aluminum foil coated with a 1 mil thick polyester coating that was bonded to three adjacently positioned plies. Each ply was comprised of two 26 pound Kraft paper laminae sandwiched about an intermediate 0.35 mil thick aluminum foil lamina. Bonded to the outermost of the plies was a 68 mils thick Kraft board that was coated with 42-7 intumescent paint produced by PPG Industries, Inc. The aluminum foil lamina was bonded to the polyester coating and the adjacent ply by a thermoplastic polyethylene adhesive. The adjacent plies were bonded together by the same water soluble silicate adhesive as was employed in the sidewalls.

Eighteen pallets each containing sixteen drums were positioned within the test facility. The sixteen drums were positioned on each pallet in two 8 drum tiers; each tier being staggered in a 3-2-3 pattern. The pallets were stacked 3 high in three rows of two stacks. The stacks abutted one another and the rows were six inches apart. A total of 288 drums were in the three rows. A "witness" pile of ten drums, each containing 75 pounds of 65% granular calcium hypochlorite, were arranged in two 5 drum high stacks. The stacks were located eight feet across from the main test group.

The following results were observed for each sample:

| Sample No. | Time From Ignition To Conclusion Of Test | Time To 1st Drum Rupture | Ceiling Temperature | Floor Temperature | Observations |
| --- | --- | --- | --- | --- | --- |
| 1 | 31 minutes | 8 min., 50 sec. | 100° F. | 2100° F. | Sprinkler system was not activated. Fire burnt itself out. Drums minimally damaged. |
| 2 | 22 minutes | 5 min., 40 sec. | 130° F. | 1710° F. | Sprinkler system was not activated. Fire burned very slowly and extinguished itself. |
| 3 | 15 minutes | 7 minutes | No Increase Over ambient temp. of ~ 70° | Not recorded | Sprinkler system was not activated. No major fire. About 10-12 drums unscathed except for being heated. |
| 4 | 22 minutes | 4 min., 30 sec. | 110° F. | 1500° F. | Sprinkler system not activated. No major fire, about half of the drums completely unscathed except for being heated. |
| 5 | 35 minutes | 29 min., 34 sec. | 315° F. | Not recorded | Two Factory Mutual Igniters were used to start fire. At 14 minutes and 30 seconds, a third igniter was added. At 26 minutes and 15 seconds, a fourth igniter was added to a pallet. Sprinkler system activated at 30 minutes. At 33 minutes, no fire was present. The witness pile was unscathed. |

While the preferred structure in which the principles of the present invention have been incorporated is shown and described above, it is to be understood that the invention is not to be limited to the particular details thus presented, but in fact, widely different means may be employed in the practice of the broader aspect of this invention. Specifically, it should be understood that the improved fire and heat resistant partition could be employed as a panel for use in the sidewalls of a building or as part of the sidewall in a crate or box for which increased fire and heat resistance is desired. Additionally, it should also be understood that the polymer utilized to coat the interior of the partition to aid in preventing corrosion could be omitted. Using an inner surface that is constructed from a first lamina that is made from aluminum or another suitable material with sufficient thickness to permit it to function as a sacrificial liner when subject to corrosive agents would be within the teachings of the instant invention. Further, it should be understood that is is possible to construct the partition or sidewall such that the bonding agent used to bond together the adjacent plies and laminae could be a non-fire and heat resistant adhesive, although this gives a structure that is less effective than when a fire and heat resistant adhesive is employed. It should also be understood that the term "fibrous material" is intended to encompass any end product containing cellulose as a raw material in its manufacture. Any other material exhibiting suitable fibroid characteristics could also be employed, such as a fibrous glass cloth or a cloth impregnated with fibrous glass particles.

The scope of the appended claims is thus intended to encompass all obvious changes in the details, materials, and arrangement of parts which will occur to one of skill in the art upon a reading of the disclosure.

We claim:

1. In a fire and heat resistant partition having a first side and an opposing second side with a plurality of laminae therebetween to protect an object adjacent the first side from a fire or heat generating source adjacent the second side, the combination comprising:
   (a) a first lamina of predetermined thickness defining the first side and formed at least partially of aluminum;
   (b) at least one ply bonded to the first lamina, the ply comprising:
      i. a second lamina of fibrous material of predetermined thickness and strength adjacent the first lamina;
      ii. a third lamina of predetermined thickness formed at least partially of an aluminum and having generally planar opposing sides;
      iii. a fourth lamina of fibrous material of predetermined thickness and strength; and
      iv. a first bonding agent bonding each lamina of fibrous material to each of the opposing sides of the third lamina; and
   (c) a second bonding agent of predetermined thickness bonding the at least one ply to the first lamina.

2. The partition according to claim 1 wherein the first lamina further has an interior surface and an exterior surface, the exterior surface being coated with a polymer of predetermined thickness thereby defining the first side.

3. The partition according to claim 2 wherein the polymer is polyethylene.

4. The partition according to claim 2 wherein the polymer is polyester.

5. The partition according to claims 3 or 4 wherein the thickness of the polymer is from about 0.50 mils to about 1.50 mils.

6. The partition according to claim 1 wherein the predetermined thickness of the first lamina is from about 0.75 mils to about 3.25 mils.

7. The partition according to claim 6 wherein an intermediate lamina of fibrous material of predetermined thickness having a first side and an opposing second side is positioned between the first lamina and the at least one ply and further is bonded to the at least one ply by a water soluble silicate of predetermined thickness.

8. The partition according to claim 7 wherein the thickness of the water soluble silicate is from about 0.5 mils to about 3.0 mils.

9. The partition according to claim 7 wherein the intermediate lamina of fibrous material is 46 pound Kraft paper.

10. The partition according to claim 9 wherein the intermediate lamina of fibrous material is bonded on the first side to the first lamina by a thermoplastic polyethylene.

11. The partition according to claim 1 wherein the first bonding agent is an organic bonding agent.

12. The partition according to claim 11 wherein the organic bonding agent is polyethylene.

13. The partition according to claim 12 wherein the predetermined thickness of the third lamina is from about 0.20 mils to about 0.50 mils.

14. The partition according to claim 13 wherein the fibrous material of the second lamina and the fourth lamina is 26 pound Kraft paper.

15. The partition according to claims 1 or 11 further comprising a fifth lamina bonded to the fourth lamina, the fifth lamina further being a fibrous material of predetermined thickness thereby defining the second side.

16. The partition according to claim 15 wherein the fifth lamina is coated with an intumescent substance.

17. The partition according to claims 1 or 14 further comprising a fifth lamina bonded to the fourth lamina, the fifth lamina further being of a predetermined thickness and formed at least partially from aluminum.

18. In a fire and heat resistant partition having a first side and an opposing second side with a plurality of laminae therebetween to protect an object adjacent the first side from a fire or heat generating source adjacent the second side, the combination comprising:
   (a) a first generally planar lamina of predetermined thickness defining the first side formed at least partially from aluminum;
   (b) a plurality of plies adjacent the first lamina including at least an innermost ply and an outermost ply arrayed such that the innermost ply is a shorter distance from the first side than the outermost ply;
      i. a second generally planar lamina of fibrous material of predetermined thickness and strength adjacent the first lamina;
      ii. a third generally planar lamina of predetermined thickness and strength formed at least partially of aluminum and having generally planar opposing sides with one of the opposing sides being adjacent the second lamina;
      iii. a fourth generally planar lamina of fibrous material of predetermined thickness and strength adjacent the other of the opposing sides of the third lamina; and
      iv. a first bonding agent bonding each lamina of fibrous material to each of the opposing sides of the third lamina;
   (c) at least one lamina of fibrous material of predetermined thickness and strength bonded to the outermost ply by bonding means; and (d) a second fire resistant bonding agent of predetermined thickness bonding each ply to each adjacent ply.

19. The partition according to claim 18 wherein the first lamina has an interior surface and an exterior surface, the exterior surface being coated with a polymer of predetermined thickness thereby defining the first side.

20. The partition according to claim 19 wherein the polymer is polyethylene.

21. The partition according to claim 19 wherein the polymer is polyester.

22. The partition according to claim 18 wherein the predetermined thickness of the first lamina is from about 0.75 mils to about 3.25 mils.

23. The partition according to claim 22 wherein the predetermined thickness of the third lamina is from about 0.20 mils to about 0.50 mils.

24. The partition according to claim 23 wherein the fibrous material of the second lamina and the fourth lamina is 26 pound Kraft paper.

25. The partition according to claim 22 wherein an intermediate lamina of fibrous material of predetermined thickness having a first side and an opposing second side is positioned between the first lamina and the innermost ply.

26. The partition according to claim 25 wherein the intermediate lamina of fibrous material is bonded by a thermoplastic bonding agent on the first side to the first lamina.

27. The partition according to claim 26 wherein the intermediate lamina of fibrous material is bonded by a fire resistant bonding agent of predetermined thickness on the opposing second side to the innermost ply.

28. The partition according to claim 27 wherein the fire resistant bonding agent is a water soluble silicate.

29. The partition according to claim 28 wherein the predetermined thickness of the water soluble silicate is from about 0.5 mils to about 3.0 mils.

30. The partition according to claim 18 wherein the at least one lamina of fibrous material bonded to the outermost ply is coated with an intumescent material.

31. The partition according to claim 30 wherein there are at least three lamina of fibrous material adjacently bonded together and coated with an intumescent material.

32. The partition according to claim 18 wherein the second fire resistant bonding agent is a water soluble silicate.

33. The partition according to claim 32 wherein the predetermined thickness of the water soluble silicate is from about 0.5 mils to about 3.0 mils.

34. The partition according to claim 32 wherein the bonding means is a water soluble silicate of predetermined thickness.

35. The partition according to claim 34 wherein the predetermined thickness of the silicate is from about 0.5 mils to about 3.0 mils.

36. The partition according to claim 18 wherein the first bonding agent is an organic bonding agent.

37. The partition according to claim 36 wherein the organic bonding agent is polyethylene.

38. The partition according to claim 18 wherein the at least one lamina of fibrous material bonded to the outermost ply is formed at least partially of aluminum.

39. The partition according to claim 38 wherein the plurality of plies number from about four to about six.

* * * * *